United States Patent
Hung (10) Patent No.: US 12,174,496 B2
(45) Date of Patent: Dec. 24, 2024

(54) DISPLAY DEVICE

(71) Applicant: Innolux Corporation, Miaoli County (TW)

(72) Inventor: Meng-Chang Hung, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/308,684

(22) Filed: Apr. 28, 2023

(65) Prior Publication Data

US 2023/0258987 A1 Aug. 17, 2023

Related U.S. Application Data

(63) Continuation of application No. 17/829,373, filed on Jun. 1, 2022, now Pat. No. 11,668,981, which is a
(Continued)

(30) Foreign Application Priority Data

Oct. 16, 2019 (CN) .......................... 201910984747.8

(51) Int. Cl.
*G02F 1/1362* (2006.01)
*G02F 1/1343* (2006.01)
(Continued)

(52) U.S. Cl.
CPC ...... *G02F 1/134336* (2013.01); *G02F 1/1347* (2013.01); *G02F 1/136286* (2013.01);
(Continued)

(58) Field of Classification Search
CPC ..................................................... G02F 1/1362
See application file for complete search history.

(56) References Cited

U.S. PATENT DOCUMENTS

| 2006/0158576 A1* | 7/2006 | Kim ...................... G02F 1/1393 |
| | | 349/139 |
| 2009/0015762 A1* | 1/2009 | Noguchi ........... G02F 1/134363 |
| | | 349/96 |

(Continued)

FOREIGN PATENT DOCUMENTS

| CN | 205827025 | 12/2016 |
| CN | 110308596 | * 3/2022 ........... G02F 1/1362 |

OTHER PUBLICATIONS

"Office Action of China Counterpart Application", issued on Jan. 30, 2024, p. 1-p. 6.

(Continued)

*Primary Examiner* — Sang V Nguyen
(74) *Attorney, Agent, or Firm* — JCIPRNET (57) ABSTRACT

The disclosure provides a display device including a first display panel and a second display panel. The second display panel is disposed corresponding to the first display panel. The second display panel includes a substrate, a data line disposed on the substrate and two adjacent scan lines disposed on the substrate. Two adjacent scan lines are crossing the data line. The data line comprises a segment that is located between the two adjacent scan lines. The segment comprises a first portion extending along a first direction and a second portion extending a second direction different from the first direction, and there is a sharp corner formed at an intersection of the first portion and the second portion.

11 Claims, 8 Drawing Sheets

Related U.S. Application Data continuation of application No. 17/033,697, filed on Sep. 26, 2020, now abandoned.

(51) Int. Cl.
*G02F 1/1347* (2006.01)
*G02F 1/1368* (2006.01)

(52) U.S. Cl.
CPC ...... *G02F 1/134345* (2021.01); *G02F 1/1368* (2013.01); *G02F 2201/121* (2013.01); *G02F 2201/123* (2013.01); *G02F 2201/44* (2013.01)

(56) References Cited

U.S. PATENT DOCUMENTS

| | | | | |
|---|---|---|---|---|
| 2012/0293736 | A1* | 11/2012 | Jung | G09G 3/2074 349/37 |
| 2016/0202586 | A1* | 7/2016 | Chang | G02F 1/136227 257/72 |
| 2019/0129213 | A1* | 5/2019 | Cho | G02F 1/13471 |

OTHER PUBLICATIONS

"Search Report of Europe Counterpart Application", issued on Oct. 9, 2024, p. 1-p. 12.

\* cited by examiner

DISPLAY DEVICE

CROSS-REFERENCE TO RELATED APPLICATION

This application is a continuation application of and claims the priority benefit of a prior application Ser. No. 17/829,373, filed on Jun. 1, 2022. The prior application Ser. No. 17/829,373 is a continuation application of and claims the priority benefit of a prior application Ser. No. 17/033,697, filed on Sep. 26, 2020, which claims the priority benefit of China application serial no. 201910984747.8, filed on Oct. 16, 2019. The entirety of each of the above-mentioned patent applications is hereby incorporated by reference herein and made a part of this specification.

BACKGROUND

1. Technical Field

The disclosure relates to an electronic device, in particular to a display device.

2. Description of Related Art

With the rapid development of electronic products, the display technology used in electronic products is also constantly improved. The display device is constantly improving towards better display effect.

SUMMARY

The main purpose of this disclosure is to provide a display device with better quality.

According to the embodiments of the disclosure, a display device includes a first display panel and a second display panel. The second display panel is disposed corresponding to the first display panel. The second display panel includes a substrate, a data line disposed on the substrate and two adjacent scan lines disposed on the substrate. Two adjacent scan lines are crossing the data line. The data line comprises a segment that is located between the two adjacent scan lines. The segment comprises a first portion extending along a first direction and a second portion extending a second direction different from the first direction, and there is a sharp corner formed at an intersection of the first portion and the second portion.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE PRESENT EMBODIMENTS

Reference will now be made in detail to the embodiments of the disclosure, examples of which are illustrated in the accompanying drawings. Wherever possible, the same reference numbers are used in the drawings and the description to refer to the same or like parts.

In the following description and in the claims, the terms "include", "comprise" and "have" are used in an open-ended fashion, and thus should be interpreted to mean "include, but not limited to . . . ".

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

"A structure (or layer, component, substrate) is referred to as being "disposed on" or "located on" another structure (or layer, component, substrate)" described in this disclosure may refer to the two structures being adjacent and directly connected, or it may mean that the two structures are adjacent but not directly connected. "Indirect connection" means that there is at least one intermediary structure (or intermediary layer, intermediary component, intermediary substrate, intermediary space) between the two structures, in which the lower surface of a structure is adjacent to or directly connected to the upper surface of the intermediary structure, and the upper surface of the other structure is adjacent to or directly connected to the lower surface of the intermediary structure. The intermediary structure may be a single-layer or multi-layer physical structure or non-physical structure, with no limit. In this disclosure, when a structure is configured "on" or "above" another structure, it may mean that the structure is "directly" on or above another structure, or that the structure is "indirectly" on or above another structure, with at least one structure sandwiched between the two structures.

"Electrical connection" or "coupling" described in this disclosure may refer to direct connection or indirect connection. In the case of direct connection, the endpoints of the components on two circuits may be directly connected or connected to each other via conductor segments. In the case of indirect connection, the endpoints of the components on two circuits may include a combination of one of the switch, diode, capacitor, inductor, or other components of non-conductor segments and at least one conductive segment or resistor, or a combination of at least two of the above and at least one conductive segment or resistor, but the disclosure is not limited thereto.

The display device described in this disclosure can be applied to various electronic devices, including the display device, antenna device, sensing device or tiled device, but the disclosure is not limited thereto. The electronic device may be an inflexible or flexible electronic device, and may include, for example, the liquid crystal, light-emitting diode, fluorescence, phosphor, or other suitable materials in any arbitrary arrangement or combination, but the disclosure is not limited thereto. The light emitting diode may include, for example, the organic light emitting diode (OLED), sub-millimeter light-emitting diode (mini LED), micro light-emitting diode (micro LED) or quantum dot (QD, for example, QLED, QDLED), but the disclosure is not limited thereto. The antenna device may be, for example, a liquid crystal antenna, but the disclosure is not limited thereto. The tiled device may be, for example, a display tiled device or an antenna tiled device, but the disclosure is not limited thereto. It should be noted that the electronic device may be any arbitrary arrangement and combination described above, but the disclosure is not limited thereto. A display device will be used as an electronic device or tiled device to explain the contents of the disclosure, but the disclosure is not limited thereto.

In the disclosure, the various embodiments described below may be mixed and matched without departing from the spirit and scope of the disclosure. For example, some features of one embodiment may be combined with some features of another embodiment to form another embodiment.

Reference will now be made in detail to the exemplary embodiments of the disclosure, examples of which are illustrated in the drawings. Wherever possible, the same component numerals are used in the drawings and descriptions to refer to the same or similar parts.

Figure 1:
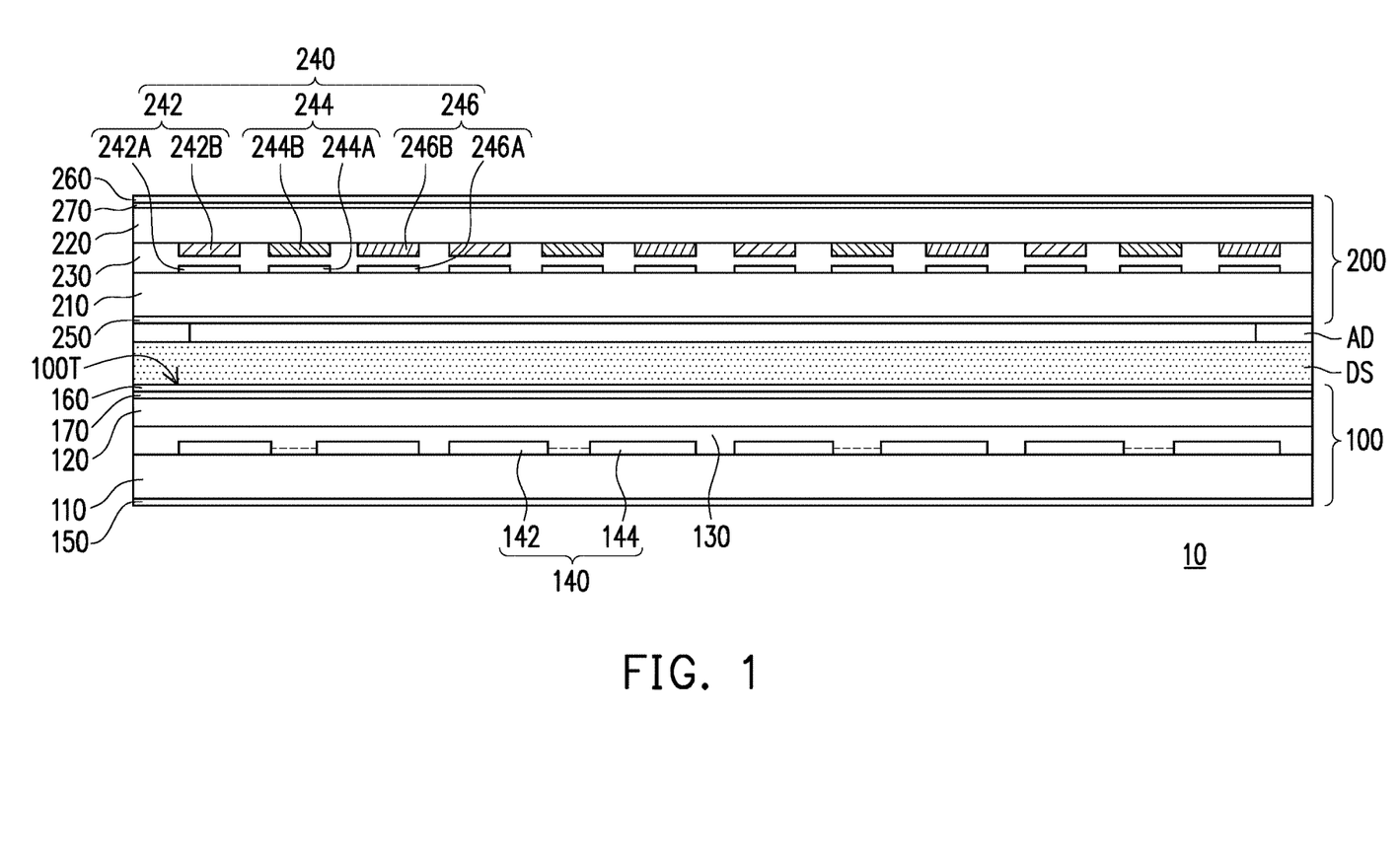
FIG. 1 is a schematic cross-sectional view of a display device according to an embodiment of the disclosure.

FIG. 1 is a schematic cross-sectional view of a display device according to an embodiment of the disclosure; In FIG. 1, a display device 10 includes a first display panel 100 and a second display panel 200 disposed above the first display panel 100. In this embodiment, the second display panel 200 may be attached to the first display panel 100 through an adhesive layer AD. The adhesive layer AD may have a hollow square shape in the top view, or may be disposed with the entire surface coated between the first display panel 100 and the second display panel 200, but the disclosure is not limited thereto. In addition, the display device 10 further includes a diffuser DS disposed between the first display panel 100 and the second display panel 200. Specifically, the diffuser DS may be, for example, a light diffuser adapted to scatter the light traveling from the first display panel 100 toward the second display panel 200. The diffuser DS may be attached to an upper surface 100T of the first display panel 100; the adhesive layer AD may be disposed on the diffuser DS, and the second display panel 200 may be attached to the first display panel 100 through the adhesive layer AD. In some embodiments, the diffuser DS may be integrated in the second display panel 200. In this embodiment, the first display panel 100 may be positioned farther away from the viewer/user than the second display panel 200. The second display panel 200 may be used to display color information of the screen, and the first display panel 100 may provide a regionalized brightness adjustment function. In this way, the first display panel 100 and the second display panel 200 work together to achieve a higher contrast display effect.

In this embodiment, the first display panel 100 includes a substrate 110, another substrate 120, a display medium 130, and a first pixel unit 140. The substrate 110 and the substrate 120 are paired up and down, and the display medium 130 is disposed between the substrate 110 and the substrate 120. The substrate 110 and the substrate 120 may each be a transparent substrate, such as a transparent plastic substrate or a glass substrate. For example, the materials of the substrate 110 and the substrate 120 may include glass, quartz, sapphire, ceramic, polycarbonate (PC), polyimide (PI), polyethylene terephthalate (PET), glass fiber, other suitable substrate materials, or a combination of the above, but the disclosure is not limited thereto. The material of the display medium 130 may include liquid crystal material, electrowetting display material, electrophoretic display material, other suitable materials, or a combination of the above, but the disclosure is not limited thereto. The first pixel unit 140 is disposed, for example, on the substrate 110 and located between the display medium 130 and the substrate 110. The first pixel unit 140 is used to provide a driving electric field to drive the display medium 130 to achieve a desired display effect.

In this embodiment, the first pixel unit 140 may include at least a first sub-pixel 142 and a second sub-pixel 144; the first sub-pixel 142 and the second sub-pixel 144 are connected in parallel, or the first sub-pixel 142 is electrically connected to the second sub-pixel 144. In FIG. 1, a dotted line is shown connecting the first sub-pixel 142 and the second sub-pixel 144 to demonstrate the electrical connection between the first sub-pixel 142 and the second sub-pixel 144. The specific connection between the first sub-pixel 142 and the second sub-pixel 144 will be described below.

In some embodiments, the display medium 130 of the first display panel 100 may be a liquid crystal material and the first display panel 100 further includes a polarizing film 150, another polarizing film 160, and a transparent conductive layer 170. The polarizing film 150 is disposed on a side of the substrate 110, the polarizing film 160 is disposed on a side of the substrate 120, and the transparent conductive layer 170 is disposed between the substrate 120 and the polarizing film 160. The substrate 110 and the substrate 120 are disposed between the polarizing film 150 and the polarizing film 160, and the display medium 130 and the first pixel unit 140 are disposed between the substrate 110 and the substrate 120. The transparent conductive layer 170 may be used to provide an antistatic effect to reduce the probability of the first display panel 100 being damaged due to static electricity. In other embodiments, the transparent conductive layer 170 may also be omitted. The polarization directions of the polarizing film 150 and the polarizing film 160 may cross each other or be parallel to each other. In addition, the first display panel 100 may provide a brightness adjustment function without having a color adjustment function. Therefore, the first display panel 100 may not include a component related to color filter.

The second display panel 200 includes a substrate 210, another substrate 220, a display medium 230, and a second pixel unit 240. The substrate 210 and the substrate 220 are paired up and down, and the display medium 230 is disposed between the substrate 210 and the substrate 220. The second pixel unit 240 is disposed, for example, between the substrate 210 and the substrate 220. The second pixel unit 240 is used to provide a driving electric field to drive the display medium 230 to achieve a desired display effect. The material of the display medium 230 may be the same as or different from the display medium 130 of the first display panel 100, but the disclosure is not limited thereto. The second display panel 200 may further include a polarizing film 250, another polarizing film 260, and a transparent conductive layer 270. The polarizing film 250 is disposed on a side of the substrate 210, the polarizing film 260 is disposed on a side of the substrate 220, and the transparent conductive layer 270 is disposed between the substrate 220 and the polarizing film 260. The substrate 210 and the substrate 220 are disposed between the polarizing film 250 and the polarizing film 260, and the display medium 230 and the second pixel unit 240 are disposed between the substrate 210 and the substrate 220. The transparent conductive layer 270 may be used to provide an antistatic effect to reduce the probability of the second display panel 200 being damaged due to static electricity. In other embodiments, the transparent conductive layer 270 may also be omitted or be replaced with other components. In some embodiments, the diffuser DS may be integrated with the polarizing film 250 to form a polarizing film with the function of light diffusion. Therefore, the diffuser DS between the first display panel 100 and the second display panel 200 may be omitted.

In this embodiment, the second pixel unit 240 includes multiple sub-pixels, for example, a first sub-pixel 242, a second sub-pixel 244, and a third sub-pixel 246. Specifically, the first sub-pixel 242 may include a driving layer 242A and a color filter 242B, the second sub-pixel 244 may include a driving layer 244A and a color filter 244B, and the third sub-pixel 246 may include a driving layer 246A and a color filter 246B. The driving layer 242A, the driving layer 244A, and the driving layer 246A may each include components such as an active component (not shown) and a pixel electrode (not shown), and are adapted to generate a driving electric field to drive the display medium 230. The color filter 242B, the color filter 244B, and the color filter 246B each are filter structures of different colors, respectively. For example, in some embodiments, the color filter 242B, the color filter 244B, and the color filter 246B are a red filter layer, a green filter layer, and a blue filter layer, respectively. In this embodiment, the driving layer 242A, the driving layer 244A, and the driving layer 246A are used to receive different data signals, respectively, to display the corresponding color grayscale independently. The first sub-pixel 242, the second sub-pixel 244, and the third sub-pixel 246 are electrically independent of each other, and the first sub-pixel 242, the second sub-pixel 244, and the third sub-pixel 246 are used to display different colors, respectively. In this way, the first sub-pixel 242, the second sub-pixel 244, and the third sub-pixel 246 are used together to display the desired color information in the screen information. In some embodiments, the color filter 242B, the color filter 244B, and the color filter 246B may be filter structures of the same color, but the disclosure is not limited thereto.

When the display device 10 displays a screen, the first pixel unit 140 may be used to adjust the brightness of a corresponding area according to the contrast information in the screen information, and the second pixel unit 240 may be used to adjust a corresponding color grayscale according to the color information in the screen information. In this way, two second pixel units 240 having the same color grayscale can correspond to the first pixel units 140 of different brightnesses, so that the display device can display a screen of high-contrast, and the display quality of the display device 10 can be improved. In addition, in this embodiment, under specific condition, the first sub-pixel 142 and the second sub-pixel 144 of the first pixel unit 140 may be electrically connected to each other and display the same brightness. In an embodiment, the first sub-pixel 142 and the second sub-pixel 144 are connected in parallel. In another embodiment, the first sub-pixel 142 and the second sub-pixel 144 may be electrically connected to a data line DL at the same time to receive the same data, and/or electrically connected to a same active layer SE at the same time to receive the same data. Once one of the first sub-pixel 142 or the second sub-pixel 144 cannot display properly due to defects in the manufacturing process (such as an unexpected short circuit or open circuit caused by particle contamination in the manufacturing process, but the disclosure is not limited thereto), the other one can still display normally so that some of the first pixel units 140 can operate properly without compromising the entire first pixel unit 140. In other words, in the display device 10, even if there are invalid sub-pixels that cannot display properly, at least the other sub-pixel can be used to display, thus reducing the degree of deterioration of the display effect.

In the display device 10, one first pixel unit 140 may be disposed corresponding to N second pixel units 240, where N is a any value larger than 0 to 20 (0<N≤20). In other words, one first pixel unit 140 may correspond to one second pixel unit 240 or half a second pixel unit 240, and may correspond to multiple second pixel units, or even up to 20 second pixel units 240. The first pixel unit 140 may have a first pixel electrode area 140R, where the first pixel electrode area 140R may be regarded as the sum of the pixel electrode area of the first sub-pixel 142 and the pixel electrode area of the second sub-pixel 144. In addition, the second pixel unit 240 may have a second pixel electrode area 240R, where the second pixel electrode area 240R may be regarded as the sum of the pixel electrode area of the first sub-pixel 242, the pixel electrode area of the second sub-pixel 244, and the pixel electrode area of the third sub-pixel 246. In detail, "corresponding" means that the first pixel electrode area 140R is overlapped with at least 50% of the second pixel electrode area 240R.

Figure 2:
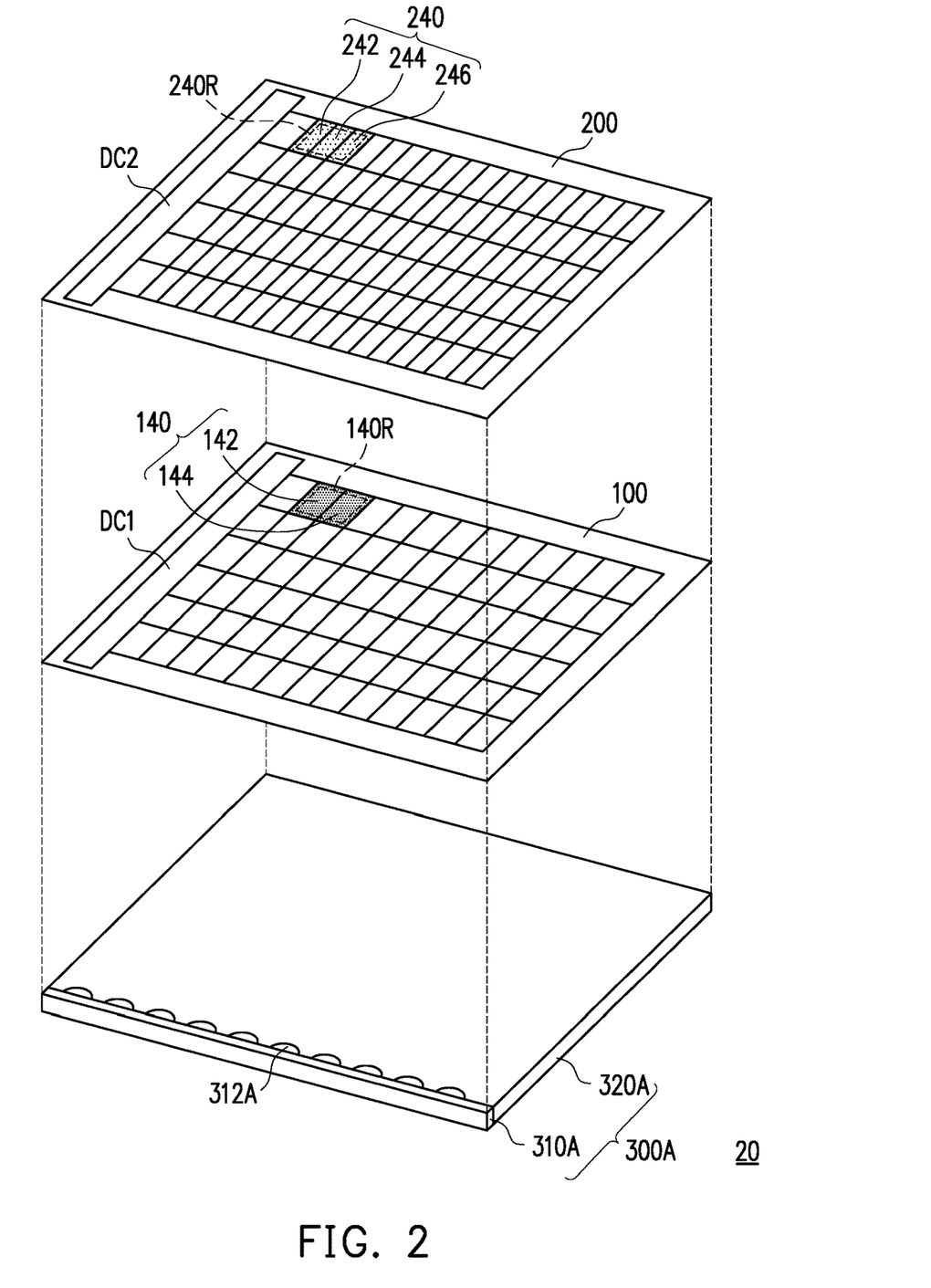
FIG. 2 is a schematic exploded view of a display device according to an embodiment of the disclosure.

FIG. 2 is a schematic exploded view of a display device according to an embodiment of the disclosure. In FIG. 2, a display device 20 includes the first display panel 100, the second display panel 200, and a backlight module 300A; the first display panel 100 and the second display panel 200 may be sequentially stacked on the backlight module 300A, and the first display panel 100 is located between the second display panel 200 and the backlight module 300A. The first display panel 100 and the second display panel 200 may be similar to the first display panel 100 and the second display panel 200 in the display device 10 of FIG. 1, therefore the same or similar numerals will be used for the same or similar components in the two embodiments. In FIG. 2, to simplify the drawings, some components of the first display panel 100 and the second display panel 200 are omitted; other components between the first display panel 100 and the second display panel 200 as well as between the first display panel and the backlight module 300 are also omitted. However, it can be understood with reference to the present embodiment of FIG. 1 that components such as the adhesive layer AD and the diffuser DS may be additionally disposed between the first display panel 100 and the second display panel 200, but the disclosure is not limited thereto.

FIG. 2 only shows the first sub-pixel 142 and the second sub-pixel 144 in one of the multiple first pixel units 140 in the first display panel 100, and also further shows a drive circuit DC1. In some embodiments, the drive circuit DC1 may be selectively disposed at any other suitable location in the first display panel 100, but the disclosure is not limited thereto. For other components of the first display panel 100, reference can be made to the present embodiment of FIG. 1. Similarly, FIG. 2 only shows the first sub-pixel 242, the second sub-pixel 244, and the third sub-pixel 246 of the second pixel unit 240 in the second display panel 200 and further shows a drive circuit DC2. In some embodiments, the drive circuit DC2 may be selectively disposed at any other suitable location in the second display panel 200, but the disclosure is not limited thereto. For other components of the first display panel 100, reference may be made to the present embodiment of FIG. 1. The drive circuit DC1 on the first display panel 100 may be used to provide a driving signal to the first pixel unit 140, and, under specific condition, the first sub-pixel 142 and the second sub-pixel 144 of the first pixel unit 140 may be electrically connected to each other and display the same brightness. In an embodiment, the first sub-pixel 142 and the second sub-pixel 144 are connected in parallel. In another embodiment, the first sub-pixel 142 and the second sub-pixel 144 may be electrically connected to the data line DL at the same time to receive the same data, and/or electrically connected to the same active layer SE at the same time to receive the same data. Therefore, the first sub-pixel 142 and the second sub-pixel 144 may be used to display the same brightness. The drive circuit DC2 on the second display panel 200 may be used to provide data signals to the first sub-pixel 242, the second sub-pixel 244, and the third sub-pixel 246 of the second pixel unit 240. Since the first sub-pixel 242, the second sub-pixel 244, and the third sub-pixel 246 are electrically independent of each other, and are used to display different color grayscales, the drive circuit DC2 on the second display panel 200 may be used to provide different data signals to the first sub-pixel 242, the second sub-pixel 244, and the third sub-pixel 246, respectively.

The backlight module 300A includes a light source 310A and a light guide plate 320A. In some embodiments, the backlight module 300A may further include a diffuser (not shown), a prism film (not shown), or other suitable components, but the disclosure is not limited thereto. The light source 310A includes one or more light-emitting components 312A, and is located on a side the of the light guide plate 320A. In this way, the light source 310A is used to emit light toward a side of the light guide plate 320A to form a side-type backlight module. In this embodiment, the light-mitting component 312A includes multiple light-emitting diodes, lamps, or other light-emitting components that may be disposed on the side of the light guide plate 320A to emit light toward a side of the light guide plate 320A. The light emitted by the light source 310A may be distributed in the entire area of the light guide plate 320A through the light guide plate 320A and emitted toward the first display panel 100. The first display panel 100 may adjust the brightness of each first pixel unit 140 according to the required screen information so that the light emitted toward the second display panel 200 has a corresponding intensity. In this way, the display device 20 can provide high-contrast display quality.

Figure 3:
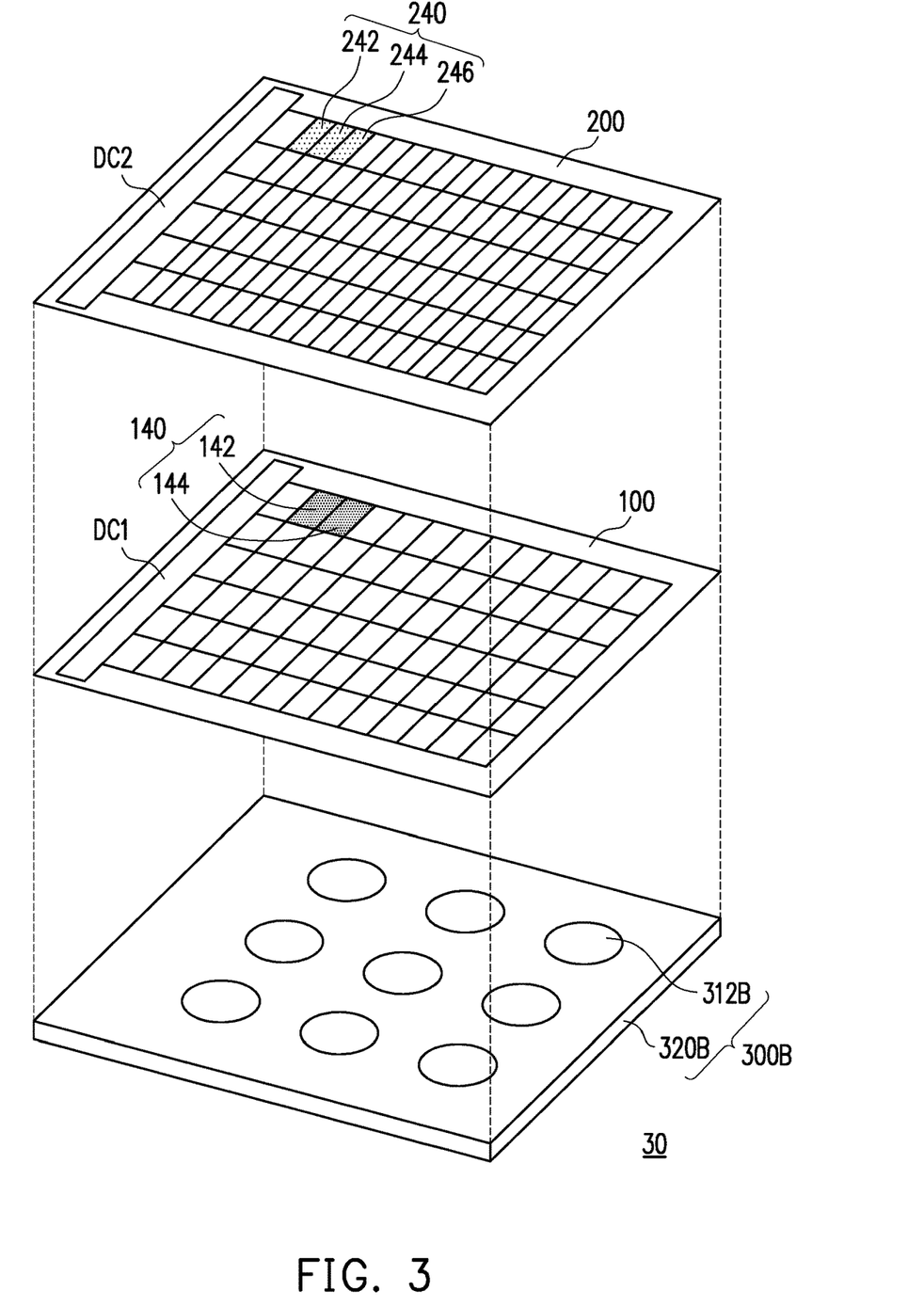
FIG. 3 is a schematic exploded view of a display device according to another embodiment of the disclosure.

FIG. 3 is a schematic exploded view of a display device according to another embodiment of the disclosure. In FIG. 3, a display device 30 includes the first display panel 100, the second display panel 200, and a backlight module 300B. The first display panel 100 and the second display panel 200 may be sequentially stacked above the backlight module 300B, and the first display panel 100 is located between the second display panel 200 and the backlight module 300B. Specifically, the display device 30 of this embodiment is similar to the display device 20 of FIG. 2, therefore the same or similar components in the two embodiments will not be repeated here. The main difference between this embodiment and the display device 20 is the design of the backlight module 300B. In this embodiment; the backlight module 300B includes multiple light-emitting components 312B and a back frame 320B, and the multiple light-emitting components 312B may be disposed in the back frame 320B. The light-emitting component 312B may be disposed in the back frame 320B in an array arrangement. In other words, the backlight module 300B is a direct-type backlight module.

The light-emitting component 312B may be, for example, a point light-emitting component or a linear light-emitting component; the point light-emitting component includes a light-emitting diode, and the linear light-emitting component includes a lamp, but the disclosure is not limited thereto. The back frame 320B may include a backsheet (not shown), and the light-emitting component 312B is disposed on the backsheet. In this way, the backsheet in the back frame 320B can reflect the light emitted by the light-emitting component 312B toward the first display panel 100. In some embodiments, the backlight module 300B may further include a diffuser (not shown), a prism film (not shown), or other suitable components, but the disclosure is not limited thereto.

Figure 4A:
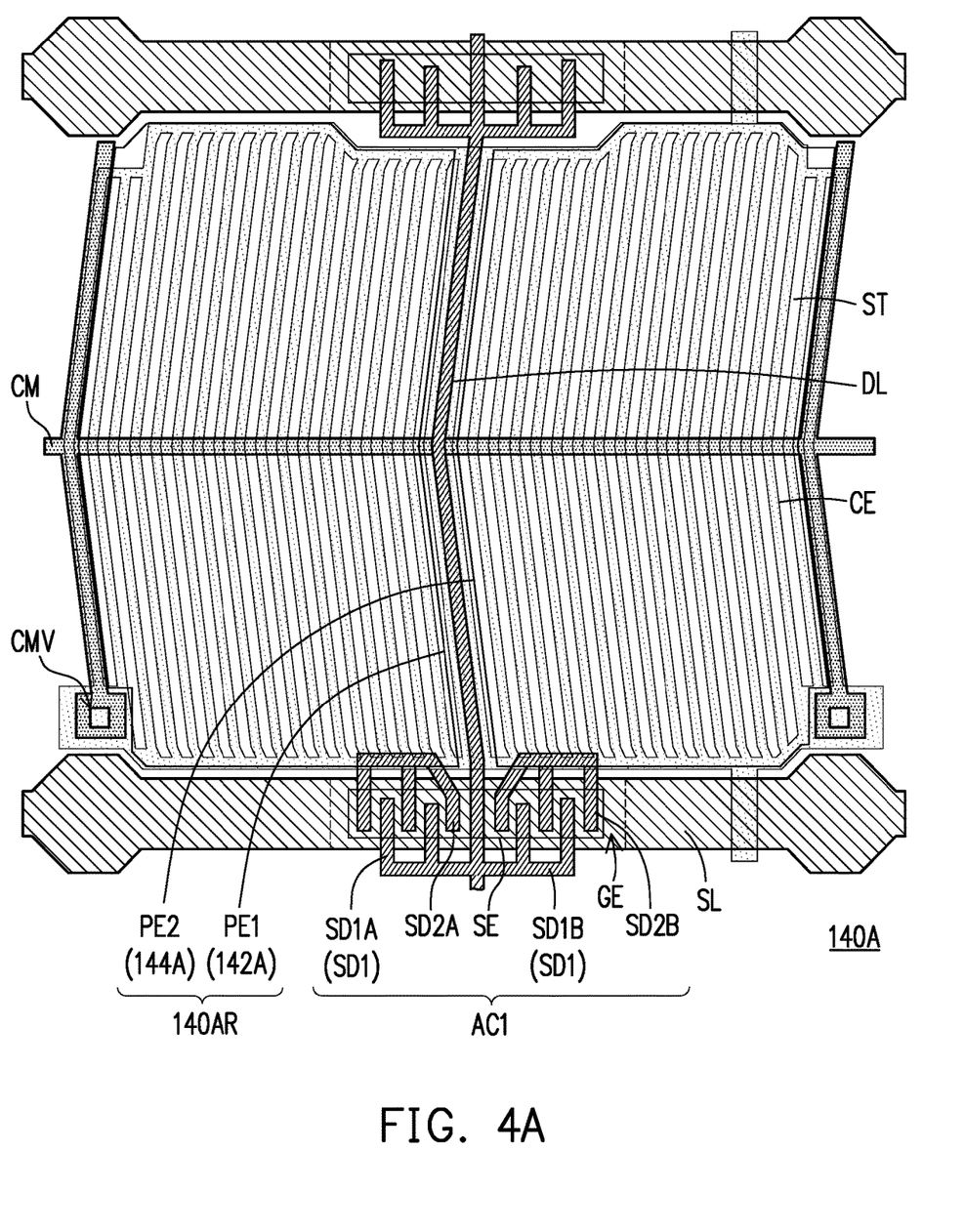
FIG. 4A is a schematic view of a first pixel unit according to an embodiment.
Figure 4B:
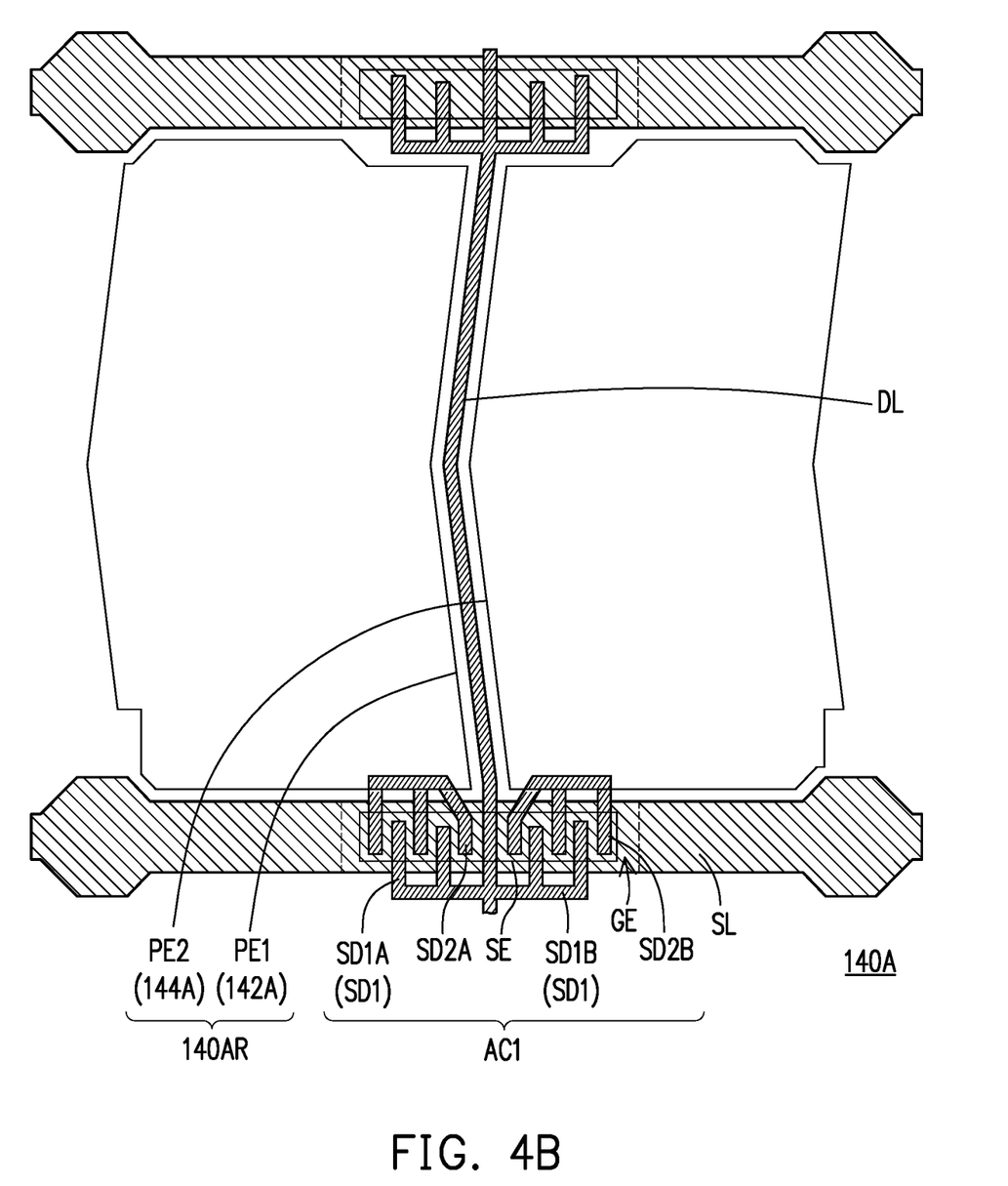
FIG. 4B is a schematic view of a first pixel unit of FIG. 4A without a common electrode and a common line.

FIG. 4A is a schematic view of a first pixel unit according to an embodiment, and FIG. 4B is a schematic view of the first pixel unit of FIG. 4A without the common electrode and the common line. Referring to FIG. 4A and FIG. 4B, a first pixel unit 140A may be applied to any one of the display device 10, the display device 20, or the display device 30 mentioned above and be disposed in the first display panel 100 as a way of implementing the first pixel unit 140 described in the above embodiment. The first pixel unit 140A may include, for example, an active component AC1, a first sub-pixel 142A, and a second sub-pixel 144A, where the first sub-pixel 142A may include a first sub-pixel electrode PE1, and the second sub-pixel 144A may include a second sub-pixel electrode PE2. The first sub-pixel electrode PE1 and the second sub-pixel electrode PE2 are respectively connected to the active component AC1, and the active component AC1 is connected to a scan line SL and the data line DL. The scan line SL intersects the data line DL, and the active component AC1 is disposed at the intersection of the scan line SL and the data line DL. The first sub-pixel electrode PE1 and the second sub-pixel electrode PE2 may be electrically connected to each other under the specific condition that the active component AC1 is switched on and display the same brightness. In an embodiment, the first sub-pixel electrode PE1 and the second sub-pixel electrode PE2 are connected in parallel. In another embodiment, the first sub-pixel electrode PE1 and the second sub-pixel electrode PE2 may be electrically connected to the data line DL at the same time to receive the same data from the data line, and/or may be electrically connected to the same active layer SE at the same time to receive the same data.

In addition, the first pixel unit 140A may further include a common electrode CE, and the common electrode CE may be at least partially overlapped with the first sub-pixel electrode PE1 and/or at least partially overlapped with the second sub-pixel electrode PE2, or overlapped with more other sub-pixel electrodes; here the range or area of the common electrode CE is not limited. In some embodiments, the first pixel unit 140A may further include a common line CM, and the common electrode CE and the common line CM may be electrically connected to each other through a contact hole CMV. In this embodiment, the common electrode CE may have multiple slit STs, and the slit ST may be at least partially overlapped with the first sub-pixel electrode PE1 and also at least partially overlapped with the second sub-pixel electrode PE2. In this way, when a corresponding signal or voltage is input to the common electrode CE, the first sub-pixel electrode PE1 and the second sub-pixel electrode PE2, a driving electric field may be generated at the edge of the slit ST to drive the display medium in the display panel. When the first pixel unit 140A is applied to the first display panel 100 of the above embodiment, the first sub-pixel electrode PE1 and the second sub-pixel electrode PE2 may be disposed between the substrate 110 (shown in FIG. 1) and the common electrode CE. In some embodiments, when the first pixel unit 140A is applied to the first display panel 100 of the above embodiment, the common electrode CE may be located between the substrate 110 (shown in FIG. 1) and the first sub-pixel electrode PE1 and between the substrate 110 (shown in FIG. 1) and the second sub-pixel electrode PE2. At this time, the first sub-pixel electrode PE1 and the second sub-pixel electrode PE2 may be provided with the slit ST. Here, the first pixel unit 140A is, for example, a fringe-field switch type pixel but the disclosure is not limited thereto. In other embodiments, the first pixel unit 140A may be a Vertical Alignment type pixel, a Twisted-Nematic type pixel, or other types of pixels, but the disclosure is not limited thereto.

In this embodiment, the patterns of the first sub-pixel electrode PE1 and the second sub-pixel electrode PE2 are independent of each other without connection. However, both the first sub-pixel electrode PE1 and the second sub-pixel electrode PE2 are connected to the active component AC1, and the active component AC1 may be driven by the single scan line SL and transmit the signals on the single data line DL to both the first sub-pixel electrode PE1 and the second sub-pixel electrode PE2. In this way, the first sub-pixel 142A and the second sub-pixel 144A can be electrically connected to each other at least when the active component AC1 is switched to the ON state.

The active component AC1 includes, for example, the active layer SE, a source SD1, a first drain SD2A, and a second drain SD2B. The material of the active layer SE may include, for example, indium gallium zinc oxide (IGZO), indium tin zinc oxide (ITZO), other metal oxides, or a combination of the above, but the disclosure is not limited thereto. In this embodiment, the active layer SE may be overlapped with the scan line SL and display a high carrier mobility (ON state) or a low carrier mobility (OFF state) according to the signals transmitted on the scan line SL. Therefore, the part of the scan line SL that is overlapped with the active layer SE may be regarded as a gate GE of the active component AC1. The source SD1 may include a first part SD1A and a second part SD1B; both the first part SD1A and the second part SD1B are connected to the data line DL, and both are at least partially overlapped with the active layer SE. In this embodiment, the materials of the first drain SD2A and the second drain SD2B may include transparent conductive material, metal material, other suitable materials, or combinations of the above, but the disclosure is not limited thereto. The transparent conductive material may include, for example, indium tin oxide, indium zinc oxide, indium oxide, zinc oxide, tin oxide, organic conductive material, other suitable materials, or a combination of the above, but the disclosure is not limited thereto. The metal material may include, for example, aluminum, molybdenum, copper, silver, other suitable materials, or a combination of the above, but the disclosure is not limited thereto. In addition, the materials of the source SD1, the first drain SD2A and the second drain SD2B may be the same as the data line DL, or may include other materials.

The first drain SD2A corresponds to the first part SD1A of the source SD1 is at least partially overlapped with the active layer SE, and the second drain SD2B corresponds to the second part SD1B of the source SD1 is at least partially overlapped with the active layer SE. The first drain SD2A and the second drain SD2B are two electrodes that are independent of each other in terms of pattern profile, but both are overlapped with the active layer SE. In addition, both the first part SD1A corresponding to the first drain SD2A and the second part SD1B corresponding to the second drain SD2B are connected to the data line DL. In this way, when the active layer SE is controlled by the signals on the gate GE and displays a high carrier mobility, the data signals on the data line DL can be transmitted from the first part SD1A to the first drain SD2A and from the second part SD1B to the second drain SD2B. In other words, the gate GE is adapted to drive the active layer SE to allow the signals of the source SD1 to be transmitted to the first drain SD2A and the second drain SD2B. Therefore, the first drain SD2A and the second drain SD2B are electrically connected to each other when the active component AC1 assumes the ON state. In addition, the first sub-pixel electrode PE1 is connected to the first drain SD2A and the second sub-pixel electrode PE2 is connected to the second drain SD2B. Therefore, the first sub-pixel electrode PE1 and the second sub-pixel electrode PE2 may be electrically connected to each other when the active component AC1 is switched to the ON state.

The first sub-pixel electrode PE1 and the second sub-pixel electrode PE2 are independent of each other in terms of pattern profile; the first drain SD2A and the second drain SD2B are also independent of each other in terms of pattern profile. In an embodiment, the first sub-pixel 142 and the second sub-pixel 144 are connected in parallel. In another embodiment, the first sub-pixel 142 and the second sub-pixel 144 may be electrically connected to the data line DL at the same time to receive the same data, and/or electrically connected to the same active layer SE at the same time to receive the same data. If a defect occurs in the process of making the first pixel unit 140A (for example, an unexpected short circuit or open circuit due to particle contamination in the process) and one of the first sub-pixel electrode PE1 or the second sub-pixel electrode PE2 cannot display properly, the other can still display normally. Therefore, the structural design of the first pixel unit 140A helps to improve the yield of the display device, in which a failed sub-pixel may be compensated by the other sub-pixel electrically connected thereto without causing the entire first pixel unit 140A to fail.

In this embodiment, the data line DL is located between the first sub-pixel electrode PE1 and the second sub-pixel electrode PE2, but the disclosure is not limited thereto. For example, in other embodiments, the first sub-pixel electrode PE1 may be located between the second sub-pixel electrode PE2 and the data line DL. In this embodiment, the scan line SL is described to be located on a side of the first sub-pixel electrode PE1 and the second sub-pixel electrode PE2, but the disclosure is not limited thereto. Moreover, the first pixel electrode area 140R of the first pixel unit 140A may be understood as the sum of the area of the first sub-pixel electrode PE1 and the area of the second sub-pixel electrode PE2. In addition, the area of the first sub-pixel electrode PE1 and the area of the second sub-pixel electrode PE2 may be the same as or different from each other.

Figure 5:
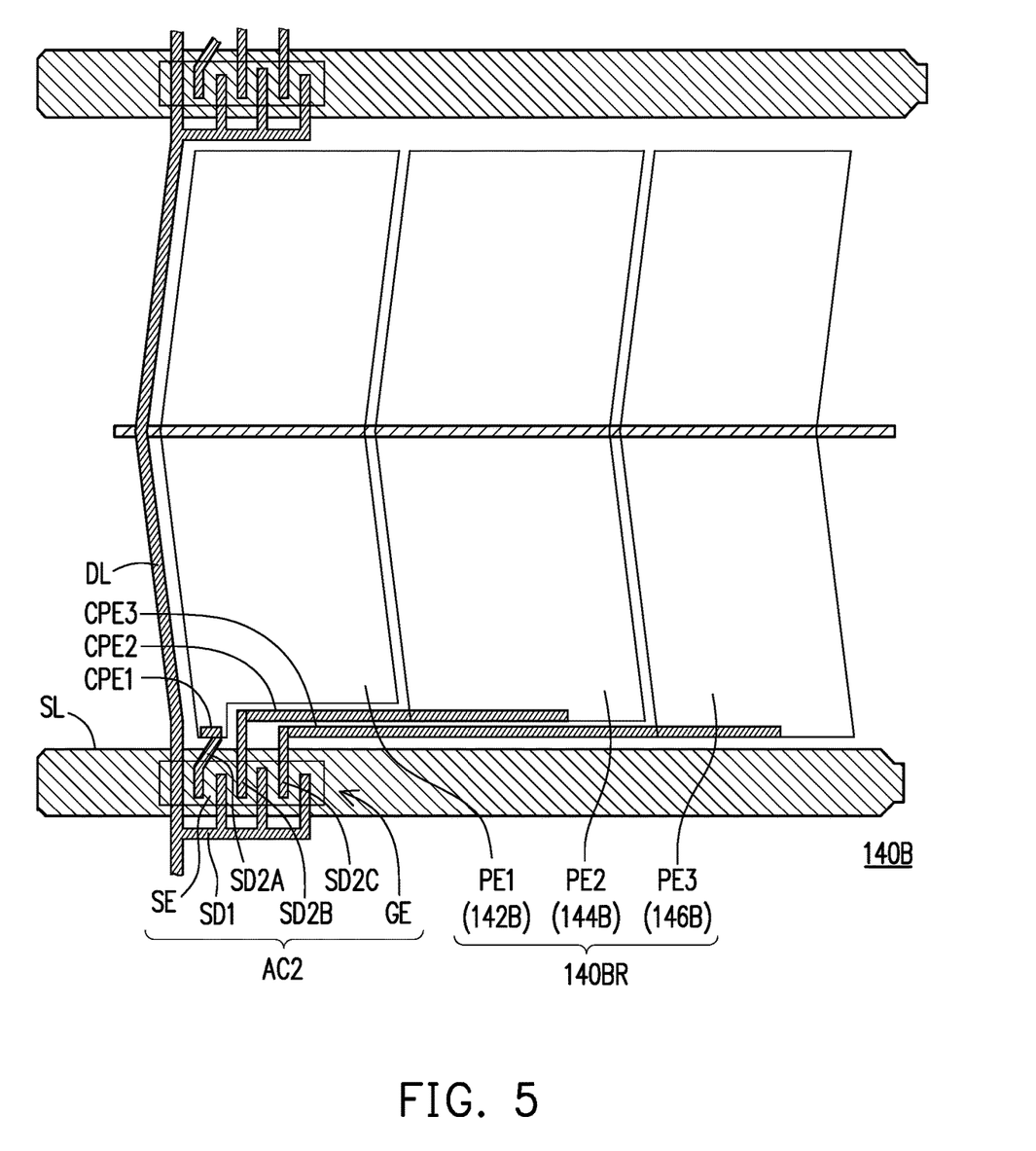
FIG. 5 is a schematic view of a first pixel unit according to another embodiment.

FIG. 5 is a schematic view of a first pixel unit according to another embodiment without the common electrode of the first pixel unit. In FIG. 5, a first pixel unit 140B may include, for example, an active component AC2, a first sub-pixel 142B, a second sub-pixel 144B, and a third sub-pixel 146B, where the first sub-pixel 142B may include the first sub-pixel electrode PE1, the second sub-pixel 144B may include the second sub-pixel electrode PE2, and the third sub-pixel 146B may include a third sub-pixel electrode PE3. In this embodiment, the first sub-pixel 142B, the second sub-pixel 144B, and the third sub-pixel 146B may be electrically connected to each other under the specific condition that the active component AC2 is switched on and display the same brightness. In an embodiment, the first sub-pixel 142B, the second sub-pixel 144B, and the third sub-pixel 146B are connected in parallel. In another embodiment, the first sub-pixel 142B, the second sub-pixel 144B, and the third sub-pixel 146B may be electrically connected to the data line DL at the same time to receive the same data from the data line DL, and/or may be electrically connected to the same active layer SE at the same time to receive the same data. The first pixel unit 140B may further include a common electrode (not shown), and the common electrode (not shown) may, just as the common electrode CE of FIG. 4A, is at least partially overlapped with the first sub-pixel electrode PE1, the second sub-pixel electrode PE2, and the third sub-pixel electrode PE3, and is provided with the slit ST as shown in FIG. 4A, but the disclosure is not limited thereto. The first sub-pixel electrode PE1, the second sub-pixel electrode PE2 and the third sub-pixel electrode PE3 are respectively connected to the active component AC2, and the active component AC2 is connected to the scan line SL and the data line DL. The scan line SL intersects the data line DL, and the active component AC2 is disposed at the intersection of the scan line SL and the data line DL. In this embodiment, the data line DL is located on a side of the first pixel unit 140B, and the first sub-pixel 142B and the second sub-pixel 144B are both located between the data line DL and the third sub-pixel 146B. Therefore, the third sub-pixel 146B is farther away from the data line DL than the first sub-pixel 142B and the second sub-pixel 144B, and the second sub-pixel 144B is farther away from the data line DL than the first sub-pixel 142B. In addition, in some embodiments, the third sub-pixel 146B of the first pixel unit 140B may be omitted and only two sub-pixels are provided (i.e., the first sub-pixel 142B and the second sub-pixel 144B). When the first pixel unit 140B is applied to the display device 10, the display device 20 or the display device 30 of the above embodiment, a first pixel electrode area 140BR of the first pixel unit 140B may be understood as the sum of the area of the first sub-pixel electrode PE1, the area of the second sub-pixel electrode PE2, and the area of the third sub-pixel electrode PE3. In some embodiments, the first pixel unit may include at least three sub-pixels, and each sub-pixel is connected in parallel with each other, but the disclosure is not limited thereto. In another embodiment, each sub-pixel in the same pixel unit may be electrically connected to the data line DL at the same time to receive the same data from the data line DL, and/or may be electrically connected to the same active layer SE at the same time to receive the same data.

The active component AC2 may include the gate GE, the active layer SE, the source SD1, the first drain SD2A, the second drain SD2B, and a third drain SD2C. The active layer SE is partially overlapped with the scan line SL, and the part of the scan line SL that is overlapped with the active layer SE may be regarded as the gate GE. The source SD1 is connected to the data line DL and is at least partially overlapped with the active layer SE. The pattern profiles of the first drain SD2A, the second drain SD2B, and the third drain SD2C are independent of each other without connection. The first drain SD2A, the second drain SD2B, and the third drain SD2C all are at least partially overlapped with the active layer SE and all correspond to the source SD1. The first sub-pixel electrode PE1 is connected to the first drain SD2A, the second sub-pixel electrode PE2 is connected to the second drain SD2B, and the third sub-pixel electrode PE3 is connected to the third drain SD2C.

The first sub-pixel electrode PE1, the second sub-pixel electrode PE2, and the third sub-pixel electrode PE3 have independent pattern profiles from each other, and the pattern profiles of the first drain SD2A, the second drain SD2B, and the third drain SD2C are also independent of each other. The gate GE is adapted to drive the active layer SE so that the active layer SE can have high carrier mobility, and the signals on the data line DL can be transmitted from the source SD1 to the first drain SD2A, the second drain SD2B, and the third drain SD2C and be input to the first sub-pixel electrode PE1, the second sub-pixel electrode PE2, and the third sub-pixel electrode PE3. Therefore, when the active component AC2 assumes the ON state, the first sub-pixel 142B, the second sub-pixel 144B, and the third sub-pixel 146B may be electrically connected to each other.

In this embodiment, the first sub-pixel 142B, the second sub-pixel 144B, and the third sub-pixel 146B each further include a pixel connection electrode CPE1, a pixel connection electrode CPE2 and a pixel connection electrode CPE3, where the first sub-pixel electrode PE1, the second sub-pixel electrode PE2 and the third sub-pixel electrode PE3 each are respectively electrically connected and/or directly connected to the first drain SD2A, the second drain SD2B, and the third drain SD2C through, for example, the corresponding pixel connection electrode CPE1, the pixel connection electrode CPE2 and the pixel connection electrode CPE3. In an embodiment, the third sub-pixel 146B is farther away from the data line DL than the first sub-pixel 142B and the second sub-pixel 144B. In another embodiment, the pixel connection electrode CPE1, the pixel connection electrode CPE2, and the pixel connection electrode CPE3 may be electrically connected to each other under the specific condition that the active component AC1 is switched on and display the same brightness. In yet another embodiment, the pixel connection electrode CPE1, the pixel connection electrode CPE2 and the pixel connection electrode CPE3 are connected in parallel. In another embodiment, the pixel connection electrode CPE1, the pixel connection electrode CPE2, and the pixel connection electrode may be electrically connected to the data line DL at the same time to receive the same data from the data line DL, and/or may be electrically connected to the same active layer SE at the same time to receive the same data. The materials of the pixel connection electrode CPE1, the pixel connection electrode CPE2 and the pixel connection electrode CPE3 may be transparent conductive materials. In some embodiments, the materials of the pixel connection electrode CPE1, the pixel connection electrode CPE2 and the pixel connection electrode CPE3 may be the same as the first sub-pixel electrode PE1, the second sub-pixel electrode PE2 and the third sub-pixel electrode PE3. In this way, the pixel connection electrode CPE1, the pixel connection electrode CPE2, and the pixel connection electrode CPE3 may also be light-transmissive, which helps to increase the area of the display region of the first pixel unit 140B (or increase the aperture ratio of the first pixel unit 140B). In this embodiment, the areas of the first sub-pixel electrode PE1, the second sub-pixel electrode PE2, and the third sub-pixel electrode PE3 may be the same as or different from each other. In this embodiment, in the extending direction of the scan line SL, the length of the pixel connection electrode CPE2 is longer than the pixel connection electrode CPE1, and the pixel connection electrode CPE3 is longer than the pixel connection electrode CPE2 and/or the pixel connection electrode CPE1. In addition, the data line DL may be located between any two of the first sub-pixel electrode PE1, the second sub-pixel electrode PE2, and the third sub-pixel electrode PE3.

Figure 6A:
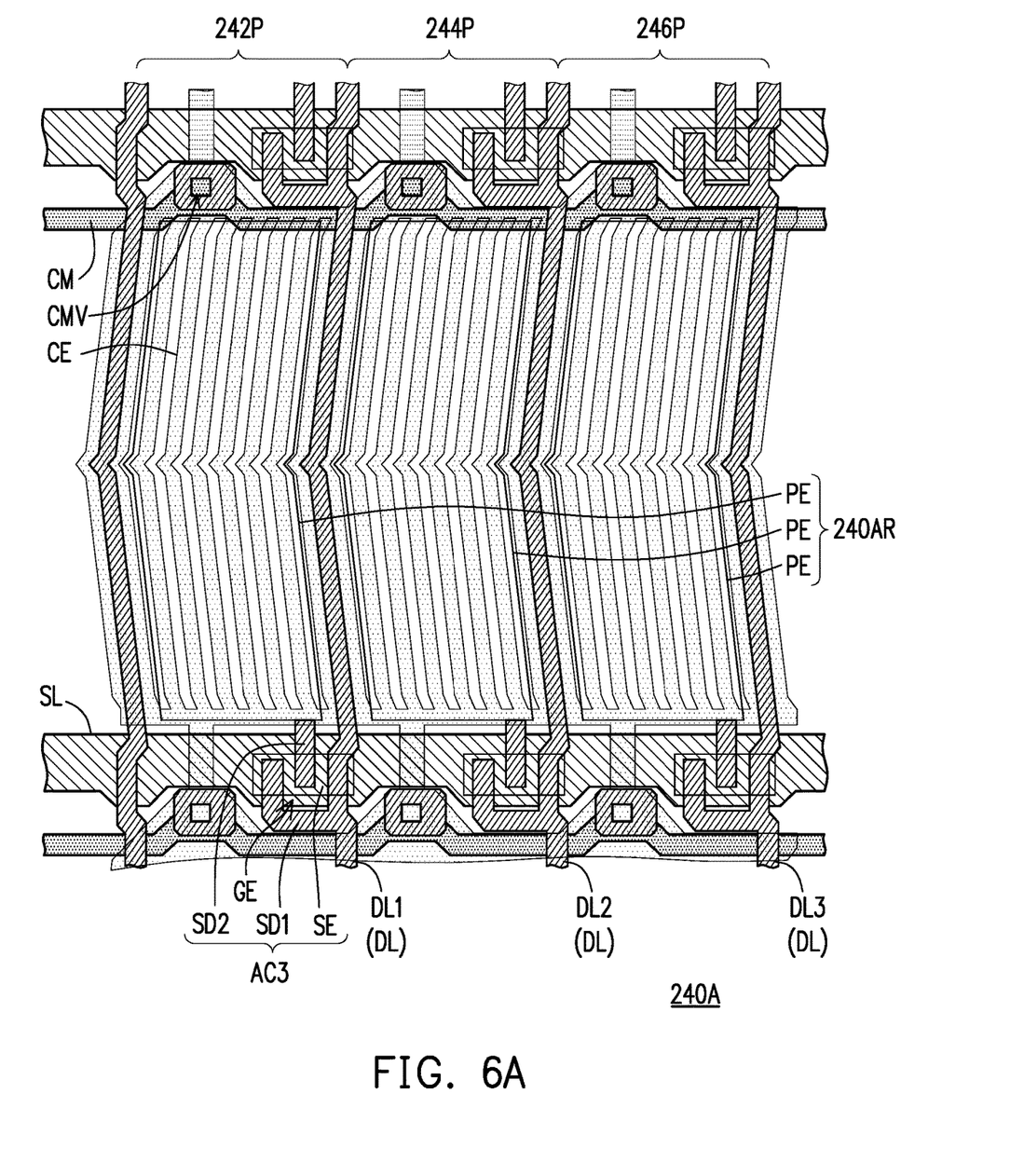
FIG. 6A is a schematic view of a second pixel unit according to an embodiment of the disclosure.
Figure 6B:
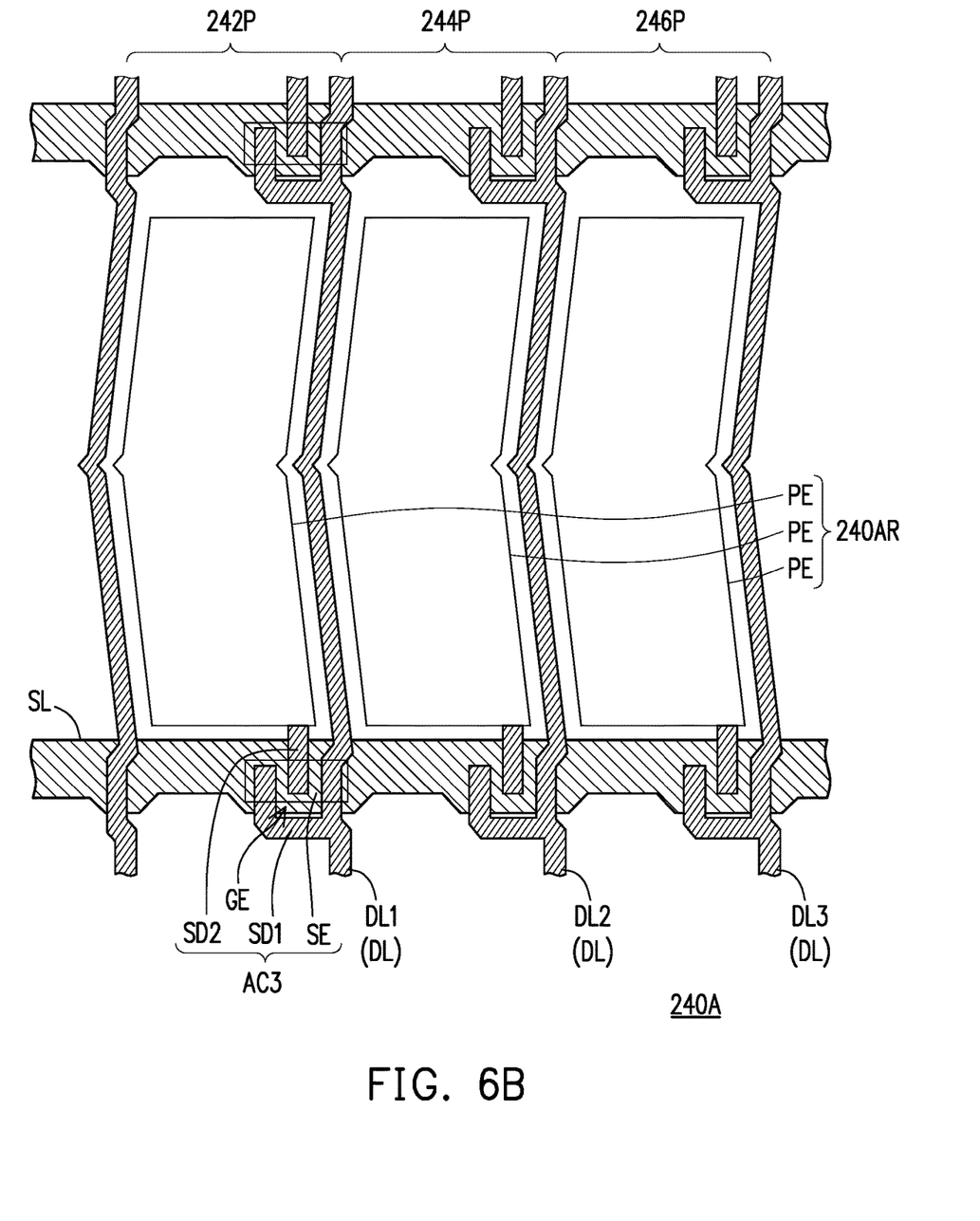
FIG. 6B is a schematic view of the second pixel unit of FIG. 6A without a common electrode and a common line.

FIG. 6A is a schematic view of a second pixel unit according to an embodiment of the disclosure, and FIG. 6B is a schematic view of the second pixel unit of FIG. 6A without the common electrode and the common line. In FIG. 6A and FIG. 6B, a second pixel unit 240A may include a first sub-pixel 242P, a second sub-pixel 244P, and a third sub-pixel 246P. The first sub-pixel 242P, the second sub-pixel 244P and the third sub-pixel 246P may include the driving layer 242A, the driving layer 244A the driving layer 246A, the color filter 242B, the color filter 244B, and the color filter 246B as shown in FIG. 1, although FIG. 6A and FIG. 6B mainly show the driving layer of each sub-pixel without the color filter. In this embodiment, the driving layers of the first sub-pixel 242P, the second sub-pixel 244P, and the third sub-pixel 246P are similar to each other, therefore the structure of the first sub-pixel 242P will be described as an example below. The driving layer of the first sub-pixel 242P may include a pixel electrode PE and an active component AC3, where the active component AC3 is connected to the scan line SL and the data line DL, and active component AC3 is located at the intersection of the scan line SL and the data line DL, but the disclosure is not limited thereto. The active component AC3 includes the gate GE, the active layer SE, the source SD1 and a drain SD2, where the active layer SE is partially overlapped with the scan line SL, and the part of the scan line SL that is overlapped with the active layer SE can be regarded as the gate GE of the active component AC3. Both the source SD1 and the drain SD2 are overlapped with the active layer SE and are separated from each other. In addition, the second pixel unit 240A may further include the common electrode CE. The pixel electrode PE is connected to the drain SD2, and the common electrode CE may be at least partially overlapped with the pixel electrode PE, or overlapped with more other pixel electrodes; here the range or area of the common electrode CE is not limited. The gate GE can drive the active layer SE to allow the source SD1 and the drain SD2 signals to connect. In some embodiments, the second pixel unit 240A may further include the common line CM, and the common electrode CE and the common line CM may be electrically connected to each other through the contact hole CMV. In the second pixel unit 240A, three data line DLs may be provided, such as a first data line DL1, a second data line DL2, and a third data line DL3, where the first sub-pixel 242P, the second sub-pixel 244P and the third sub-pixel 246P are respectively connected to the first data line DL1, the second data line DL2 and the third data line DL3. Therefore, the first sub-pixel 242P, the second sub-pixel 244P, and the third sub-pixel 246P are electrically independent, with the signals independent of each other. The second pixel unit 240A of FIG. 6A may be applied to the display device 10, the display device 20, or the display device 30 as a possible way of implementing the second pixel unit 240 described in the above embodiment. In addition, the common electrode CE and its corresponding common line CM are omitted in FIG. 6B so that the profile of the pixel electrode PE can be more clearly understood.

One of the first pixel unit 140As of FIG. 4A and the first pixel unit 140B of FIG. 5 may be applied to the display device 10, the display device 20, or the display device 30 of the above embodiment in conjunction with the second pixel unit 240A of FIG. 6A. Thus, a second pixel electrode area 240AR of the second pixel unit 240A may be regarded as the sum of the area of the pixel electrode PE of the first sub-pixel 242P, the area of the pixel electrode PE of the second sub-pixel 244P, and the area of the pixel electrode PE of the third sub-pixel 246P. The second pixel electrode area 240AR may overlap approximately 50% of the sum of the area of the first sub-pixel electrode PE1 and the area of the second sub-pixel electrode PE2 in the first pixel unit 140A (the first pixel electrode area 140AR in the first pixel unit 140A); in other words, the first pixel unit 140A corresponds to the second pixel unit 240A. Or, the second pixel electrode area 240AR may overlap approximately 50% of the sum of the area of the first sub-pixel electrode PE1, the area of the second sub-pixel electrode PE2, and the area of the third sub-pixel electrode PE3 in the first pixel unit 140B (the first pixel electrode area 140BR of the first pixel unit 140B); in other words, the first pixel unit 140B corresponds to the second pixel unit 240A.

In some embodiments, the first pixel electrode area of the first pixel unit 140A or the first pixel unit 140B (for example, the first pixel electrode area 140AR or the first pixel electrode area 140BR) may be the same as or different from the second pixel electrode area 240AR of the second pixel unit 240A, but the disclosure is not limited thereto. When less than 50% of the second pixel electrode area 240AR of the second pixel unit 240A overlaps the first pixel electrode area of the first pixel unit 240A or of the first pixel unit 140B, the display device 10, the display device 20, or the display device may adjust the display mode of the second pixel unit 240A through algorithm of the drive circuit to achieve the desired display effect.

In summary, the display device of the disclosed embodiments includes a dual panel, where the first display panel is used to adjust the brightness, and the second display panel is used to display the color information of the screen. The first display panel includes a first pixel unit and the second display panel includes a second pixel unit. The first pixel unit includes at least a first sub-pixel and a second sub-pixel connected in parallel. In the process of making the display device, if any one of the first sub-pixel or the second sub-pixel of the same first pixel unit cannot display properly, at least the other can still provide the display function. Therefore, when some sub-pixels of the first pixel unit fail, the display device can still provide a normal display effect, thereby improving the yield of the display device.

Finally, it should be noted that the above embodiments are only used to illustrate the technical solutions of the disclosure, rather than limiting it; although the disclosure has been described in detail with reference to the above embodiments, persons having ordinary skill in the art should understand that they can still modify the technical solutions described in the above embodiments, or equivalently replace part or all technical features therein while the modifications or replacements do not deviate from the scope of the technical solutions of the present embodiments of the disclosure.

What is claimed is:

1. A display device, comprising:
   a first display panel comprising:
   a plurality of first pixel units, wherein each of the plurality of first pixel units comprising a sub-pixel electrode and a common electrode overlapped with the sub-pixel electrode;
   a first data line electrically connected to one of the plurality of first pixel units and extending along a first direction;
   a first source and a first drain, wherein the first source is electrically connected to the first data line, wherein the first source forms a first notch and the first drain is corresponding to the first notch; and
   a common line, wherein the common electrode and the common line are electrically connected to each other through a contact hole; and a second display panel disposed corresponding to the first display panel and comprising:
a substrate;
a second data line disposed on the substrate;
two adjacent scan lines extending along a second direction, wherein the two adjacent scan lines are disposed on the substrate and cross the second data line; and
a second source and a second drain overlapped with one of the two adjacent scan lines, wherein the second source is electrically connected to the second data line, the second source comprises a first portion, a second portion positioned opposite to the first portion, and a third portion connected between the first portion and the second portion to form a second notch, and the second drain is corresponding to the second notch,
wherein at least a portion of the second portion extends along a third direction perpendicular to the second direction, and at least a portion of the third portion extends along the second direction, and
wherein the second data line comprises a segment that is located between the two adjacent scan lines, the segment comprises a first part extending along a fourth direction different from the second direction and the third direction and a second part extending a fifth direction different from the fourth direction, and there is a sharp corner formed at an intersection of the first part and the second part.

2. The display device according to claim 1, wherein the second display panel further comprises a pixel electrode electrically connected to the data line, the pixel electrode comprises an edge adjacent to the data line, and the edge has an another sharp corner.

3. The display device according to claim 2, wherein the edge has at least three turnings.

4. The display device according to claim 2, wherein the second display panel further comprises an another common electrode, overlapped with the pixel electrode.

5. The display device according to claim 2, wherein the sharp corner is corresponding to the another sharp corner.

6. The display device according to claim 1, wherein the second display panel is used to display color information of a screen, and the first display panel provides a regionalized brightness adjustment function.

7. The display device according to claim 1, further comprising a polarizing film disposed between the first display panel and the second display panel.

8. The display device according to claim 1, further comprising a backlight module, wherein the first display panel is disposed between the second display panel and the backlight module.

9. The display device according to claim 1, further comprising an adhesive layer, wherein the second display panel is attached to the first display panel through the adhesive layer.

10. The display device according to claim 1, wherein the first display panel comprises:
another substrate; and
wherein the sub-pixel electrode is disposed on the another substrate and comprises an extending portion; and
the first drain is disposed on the another substrate and electrically connected to the extending portion, and the extending portion extends in the first direction.

11. The display device according to claim 10, wherein the extending portion overlaps the first drain and in a sixth direction perpendicular to the first direction, a width of the extending portion is smaller than ½ of a width of the sub-pixel electrode.

* * * * *